United States Patent
Rambaud et al.

(10) Patent No.: US 7,338,696 B2
(45) Date of Patent: Mar. 4, 2008

(54) PERFORATED ADHESIVE FILM AND ITS MANUFACTURING PROCESS

(75) Inventors: Eric Rambaud, Les Sorinieres (FR); Dona Vitonou, Toulouse (FR)

(73) Assignee: Airbus France, Toulous Cedex (FR)

( * ) Notice: Subject to any disclaimer, the term of this patent is extended or adjusted under 35 U.S.C. 154(b) by 165 days.

(21) Appl. No.: 10/421,671

(22) Filed: Apr. 22, 2003

(65) Prior Publication Data

US 2004/0023026 A1    Feb. 5, 2004

(30) Foreign Application Priority Data

Apr. 25, 2002   (FR) .................................. 02 05208

(51) Int. Cl.
*B29C 65/48*   (2006.01)
*B32B 3/12*    (2006.01)

(52) U.S. Cl. .......................... 428/73; 428/68; 428/116; 428/117; 428/118; 156/292; 156/290; 156/250

(58) Field of Classification Search ................... 428/73, 428/68, 116, 117, 118; 156/292, 290, 250
See application file for complete search history.

(56) References Cited

U.S. PATENT DOCUMENTS

| | | | | |
|---|---|---|---|---|
| 3,656,992 A | * | 4/1972 | Lynam et al. | 427/284 |
| 4,803,108 A | * | 2/1989 | Leuchten et al. | 428/118 |
| 5,087,500 A | * | 2/1992 | Kasper et al. | 428/116 |
| 5,614,283 A | * | 3/1997 | Potnis et al. | 428/131 |
| 5,944,935 A | | 8/1999 | Zukas et al. | 156/285 |
| 6,099,683 A | | 8/2000 | Meier et al. | 156/292 |

FOREIGN PATENT DOCUMENTS

| GB | 2 096535 | 10/1982 |
|---|---|---|
| JP | 55017506 | 2/1980 |

* cited by examiner

*Primary Examiner*—Daniel Zirker
(74) *Attorney, Agent, or Firm*—Thelen Reid Brown Raysman & Steiner LLP

(57) ABSTRACT

The invention relates to a perforated adhesive film (16) that will be used to glue a wall on one face of a cellular structure (10) to form a sandwich panel. The adhesive film (16) comprises at least one hole and not more than three holes (18) facing each of the cells (12) of the cellular structure (10). Preferably, the holes (18) are formed by punching an unperforated adhesive film. The holes (18) enable the formation of regular glue dabs on the ends of the partitions (14) separating cells (12) in the cellular structure (10), when the adhesive film (16) is heated before the wall is glued.

10 Claims, 2 Drawing Sheets

PERFORATED ADHESIVE FILM AND ITS MANUFACTURING PROCESS

CROSS-REFERENCE TO RELATED APPLICATION

This application claims priority based on French Patent Application Serial No. 02 05208, entitled "PERFORATED ADHESIVE FILM AND ITS MANUFACTURING PROCESS" by Eric Rambaud and Dona Vitonou, filed on Apr. 25, 2002.

TECHNICAL FIELD

The main purpose of the invention is a perforated adhesive film that will be used for making "sandwich" structures with a cellular core.

More precisely, the perforated adhesive film according to the invention is intended for use to fix a wall on at least one of the faces of a cellular structure, such as a NIDA honeycomb structure.

Another purpose of the invention is a process for making such a perforated adhesive film.

STATE OF THE ART

Sandwich panels are usually assembled by gluing. In this case, one known method is to deposit an adhesive film on each of the faces of the cellular core. The walls are then glued onto the said faces by contact with this adhesive film. If necessary, a polymerization operation is then carried out on the adhesive.

When this known method is used, the adhesive covers the entire part of the two faces of the cellular core, including the hollow parts of the cells. Therefore, this method cannot be used when at least one of the walls of the panel has to remain porous after the gluing phase.

Different solutions have been made to overcome this problem. All of these solutions are designed to only leave adhesive on the ends of the cell partitions.

One first known technique is offered by the MacKAY Industries Inc. Company in the USA. This consists of using a hot air flow to heat an unperforated adhesive film previously deposited on one of the faces of the cellular core. When a given temperature is reached, the adhesive film becomes fluid and migrates to the ends of the partitions of the cells to form a glue dab.

This known technique has several disadvantages. Thus, it can only be used satisfactorily on one face of the cellular core because the cells have to be open at their opposite ends. If the cells are closed, the hot air flows that heats up the adhesive film also heats up the air contained in the cells, such that this air expands and causes a back pressure opposing the mechanical action of the hot air flow. Consequently, the adhesive film can burst, and as a result the glue dab is not uniform and the adhesive may be splashed about inside the cells. This sometimes results in an incomplete glue dab and a risk of an add-on porous wall subsequently being closed on the cellular core due to the subsequent flow of glue along the cell partitions during the final polymerization.

Another known technique is described in document U.S. Pat. No. 5,944,935. In this case, the unperforated adhesive films previously deposited on each of the faces of the cellular core are covered with a porous screen. The assembly is then pressed and heated. The adhesive films become fluid under the combined effect of temperature and pressure, and migrate into the porous structure of screens facing the cells while leaving a glue deposit on the ends of these cell partitions. The glue is then cooled using a cooling cylinder and the screen is gradually withdrawn, leaving glue dabs remaining on the ends of cell partitions.

This other known technique also has several disadvantages. Firstly, it is long and complex to implement since it involves several additional operations that are not necessary in other known gluing methods (placement of porous screens, pressurization, cooling, removal of screens, etc.). Furthermore, this technique is more expensive than other known methods since it requires more glue. A thicker adhesive film is necessary since a larger proportion of glue is removed with the porous screens. Furthermore, this induces a large quantity of waste (glue and screens) which causes problems with regard to the environment. Furthermore, as in the previous technique, heating of the cellular core can cause deformations of the core, particularly in the case of complex shapes.

Finally, this technique would appear to be difficult to apply to non-plane surfaces such as concave or convex spherical shapes.

PRESENTATION OF THE INVENTION

The purpose of the invention is to solve at least some of the problems caused by known techniques for making sandwich structures.

In particular, the invention is intended to improve manufacturing of sandwich structures and facilitate the formation of uniform glue dabs on the faces of cellular structures that will be covered by walls.

According to the invention, this result is achieved using an adhesive film that will be used to glue a wall onto one face of a cellular structure comprising adjacent cells opening up on the said face, characterized in that the adhesive film is perforated with at least one hole facing each of the cells of the cellular structure.

The presence of judiciously distributed holes on the adhesive film facilitates migration of glue towards the end of the walls of the cells when the film is heated.

Advantageously, the adhesive film is perforated by at least three holes facing each of the cells in the cellular structure. Thus, the quantity of glue remains large enough to enable migration towards the ends of the cell walls.

According to one preferred embodiment of the invention, the holes are approximately circular and their diameter is not uniform over the thickness of the said film.

In this case, the holes are advantageously provided with a significant taper. For example, their average diameter is approximately equal to 1 mm.

The holes are preferably distributed according to a regular triangular network.

In this case, the holes may in particular be aligned with each other along two directions forming an angle of about 60° between them.

More precisely, the holes are then advantageously at a spacing Px equal to approximately 7×Po/9.5 along a first of the said directions and at a distance Py equal to approximately 4.5×Po/9.5 in a direction orthogonal to this first direction, where Po is the pitch separating the cells of the cellular structure.

Another purpose of the invention is a process for making such an adhesive film, in which the holes are formed by punching an unperforated adhesive film.

Advantageously, all the holes are made by punching the adhesive film in the same direction.

Furthermore, preferably, at least one punch is used comprising a conical end, part with an angle of between approximately 30° and 35°, with an adjacent tapered part with an angle of between about 20° and 25°.

In particular, the holes can be made using a plate or a rotary roller with a plurality of punches.

BRIEF DESCRIPTION OF THE DRAWINGS

We will now describe a preferred embodiment of the invention with reference to the attached drawings, as an illustrative example that is in no way limitative, in which.

DETAILED PRESENTATION OF A PREFERRED EMBODIMENT

As described above, the invention relates to a perforated adhesive film that will be used to fix a wall on at least one face of a cellular structure in order to form a sandwich panel.

More precisely, the adhesive film perforated according to the invention may be placed on a plane or curved cellular structure and comprising cells with arbitrary shapes and dimensions, that may or may not be laid out according to a regular network.

Figure 1:
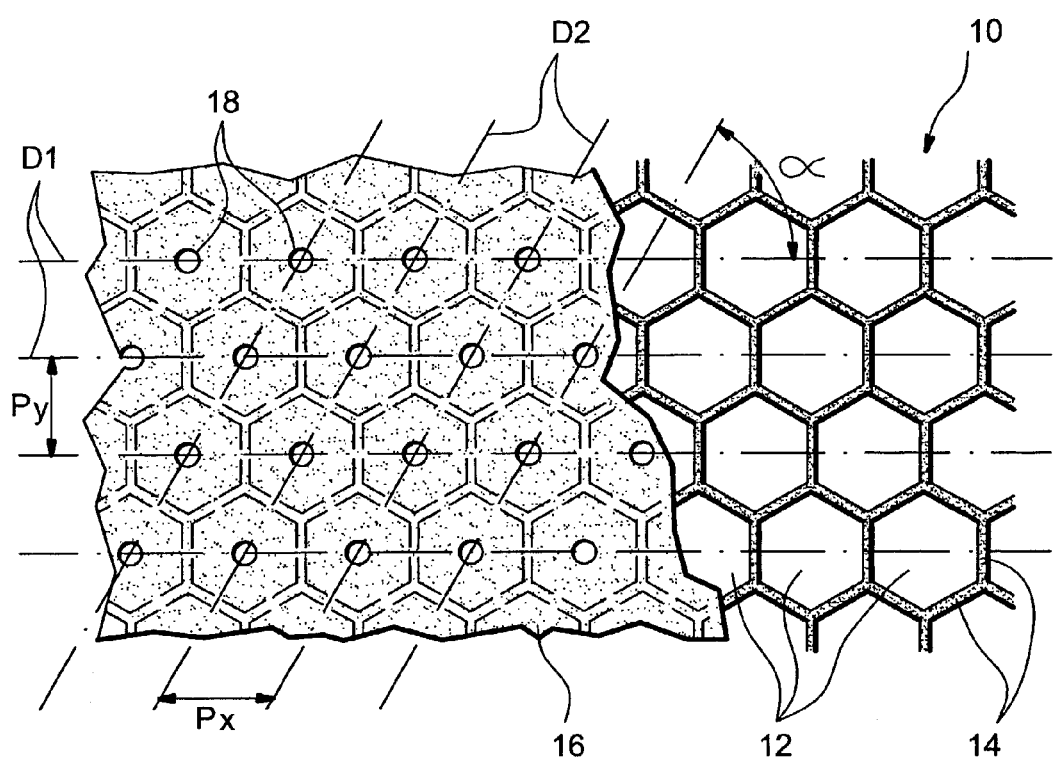
FIG. 1 is a top view that diagrammatically shows a perforated adhesive film conform with the invention, placed on one face of a cellular structure on which it is required to glue a wall.

As illustrated for example in FIG. 1, in the case of a NIDA honeycomb type of cellular structure 10 formed of hexagonal cells 12 adjacent to each other in a regular network and separated by partitions 14, the perforated adhesive film 16 conform with the invention comprises several holes 18 arranged such that at least one hole 18 and not more than three holes 18 are facing each of the cells 14.

The holes 18 will facilitate migration of the glue towards the ends of the partitions 14 of the cells 12 when the adhesive film 12 is heated. The result is thus to form glue dabs on the ends of the partitions 14 of the cells 12, that will then be used to glue a wall onto the corresponding face of the cellular structure 10.

More precisely, the number, arrangement and sizes of the holes 18 are determined to facilitate initiation of creep of the glue while keeping a sufficient quantity of glue in each of the cells 12 to form the dabs. As the size of the holes 18 increases, the quantity of glue contained in the adhesive film reduces. In practice, good results are obtained if the diameter of the holes 18 is equal to approximately 1 mm; but other dimensions may be suitable.

In practice, the shape of the holes 18 is different from the shape of a circular cylinder, in order to facilitate the migration of glue from the different holes towards the end of the partitions of the cells when the film is heated. Thus, the holes 18 are usually circular in cross section, but their diameter is not uniform through the thickness of the adhesive film 16. As a non-restrictive example, the holes 18 may be tapered. The expression "average diameter" used in the previous section takes account of the fact that the holes 18 are preferably not in the shape of a circular cylinder.

When the cellular structure 10 has an approximately plane surface to be glued and cells 12 aligned according to a regular network, the presence of at least one hole 18 facing each of the cells 12 may be achieved by using an adhesive film 16 perforated with holes 18 arranged in a regular network, in which the spacing pitch corresponds to the pitch of the cells 12 in the two directions of the plane surface to be glued.

FIG. 1 illustrates this arrangement in the special case of a cellular structure 10 in which the cells 12 are arranged according to a regular hexagonal network. In this case, the holes 18 are arranged according to a regular equilateral triangular network with a pitch equal to the pitch of the network formed by the cells 12.

However in many cases, the cellular structure 10 is flexible and deformable. The result is that the cells 12 are not perfectly aligned. Furthermore, some parts to be made are not plane. The effect of a curvature of the cellular structure is to deform the alignment of its cells. Deformations of the cellular structure may also be due to manipulations on this structure, or humidity, etc. The consequence of all these arrangements is that the cells 12 are not perfectly aligned. The use of an adhesive film as described in the previous section cannot then guarantee that a hole 18 is present at the center of the end of each cell 12 in the cellular structure.

In order to satisfy the contradictory requirements mentioned above, an adhesive film 16 is then used in which the holes 18 are arranged such that for most of the cells 12, the number of holes 18 facing the cells is equal to not more than three and not less than one. If there are too many holes 18 facing the same cell 12, there is a risk that the glue would migrate irregularly around the perimeter of the end of this cell 12, particularly if the holes 18 were located close to the ends of the partitions 14 of this cell 12. In other words, the glue dab formed would have glue accumulations at some locations and insufficient glue at other locations.

The glue will migrate more homogeneously if the hole(s) 18 is (are) located close to the center of the end of the cell 12 considered. By limiting the number of holes 18 facing each cell 12 to approximately three, a good glue distribution is guaranteed, and consequently good subsequent gluing of the wall onto the cellular structure 10 is also guaranteed.

When several holes 18 (for example two or three) exist in the same end of a cell 12, glue threads may remain at the said end after the glue creep and migration operation. However, this is not a problem since in the vast majority of cases these threads become fluid, break and the glue then migrates towards the edges of the cells during the polymerization step in which the wall is glued onto the cellular structure 10.

Many tests carried out for the purposes of this process have shown that there is an optimal layout of the holes 18, even in the case of a deformed or curved cellular structure 10. These tests have been carried out on "Eurocomposite" or "Hexcel" cellular structures, comprising approximately hexagonal cells 12 with dimensions such that the diameter of the circle inscribed in each of the cells 12 is equal to approximately 9.5 mm (⅜ inches). The adhesive film 16 used was of the thermosetting adhesive type made by "3M", reference AF191.U™.

The optimum layout of holes 18 determined according to these tests is approximately as shown in FIG. 1. Thus, the holes 18 are arranged along two directions D1 and D2 at an angle α of 60° between them, in other words according to a regular triangular network.

In the estimated example considered in the tests, the spacing between the holes 18 is at a pitch Px equal to approximately 7 mm along a first direction D1. The spacing of the holes 18 along the second direction D2 is such that the projection Py of the pitch separating them on a straight line perpendicular to the first direction D1 is equal to approximately 4.5 mm. The result obtained with this arrangement is satisfactory since only less than three cells remain blocked by the adhesive film 16 on a panel larger than 1 meter square.

For a cellular structure in which the cells have different dimensions, an adhesive film 16 perforated with holes 18 arranged in a similar manner will be used by applying a proportionality factor to the values of the pitch Px and the distance Py given in the previous section. Thus in general, a value equal to approximately 7.Po/9.5 is assigned to the pitch Px, and a value equal to approximately 4.5.Po/9.5 is assigned to the distance Py, where Po is the pitch separating cells 12 in the cellular structure 10.

The invention also relates to a process for making the perforated adhesive film that has just been described.

According to one preferred embodiment, an unperforated adhesive film is used in which holes 18 are made by punching using one or several punches.

Figure 2:
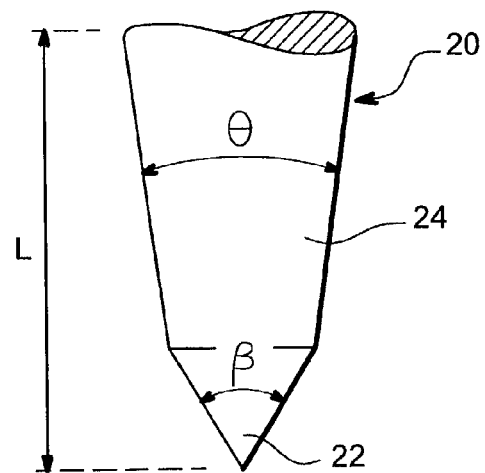
FIG. 2 is a side view that shows a punch adapted to making holes in the adhesive film in FIG. 1 at a larger scale.

The punch 20 used to make the tapered holes 18 may be made as illustrated in FIG. 2. The punch then preferably includes a tapered end part 22 and an adjacent tapered part 24.

For example, the length L of the punch 20 is approximately 6 to 8 mm. The tapered end part 22 of the punch 20 is at an angle β between approximately 30° and 35° and forms the tip of the punch. The adjacent tapered part 24 has an angle θ between about 20° and 25° and forms the body of the punch. The body of the punch has the effect of forming the tapered hole 18 when it penetrates into the adhesive film 16.

Obviously, this shape of the punch 20 is only given as a non-limitative example. In general, a person skilled in the art will use a punch adapted to the shape of the hole 18 that he wants to make in the adhesive film. For example, he can make holes with a square or triangular section, or any other section using appropriate shaped punches.

Figure 3:
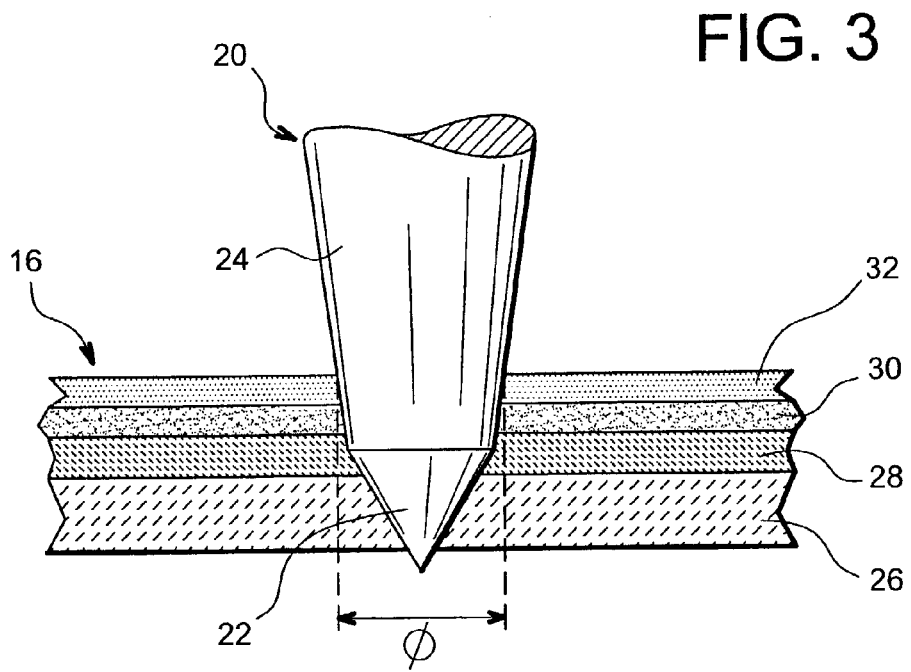
FIG. 3 is a sectional view showing how to make a hole in an adhesive film using the punch in FIG. 2.

FIG. 3 shows the drilling of the adhesive film 16 using the punch shown in FIG. 2. In this figure, it can be seen that when the adhesive film 16 is punched, it comprises rigid cardboard 26, a paper separator 28, an adhesive film 30 and a polyethylene separator 32, in order. In order to assure that creep and migration of the glue are homogenous for each of the holes 18 formed in the adhesive film 16, it should be noted that the punching operation is preferably done in the same direction for all holes, for example by making the punch 20 penetrate from the separator 32 made of polyethylene towards the rigid box 26 as shown in FIG. 3.

In particular, a rigid plane plate fitted with several punches like the punch 20 in FIG. 2, can be used for industrial production of a perforated adhesive film according to the invention.

The punches are arranged on the plate, preferably perpendicular to the plane of the plate, the tip of each punch facing away from the said plate. The punches are arranged on the plate such that their centerlines correspond to the required layout of the holes 18 on the adhesive film 16. Preferably, the tips of the different punches 20 are located in the same plane to achieve homogeneous penetration of the tips into the adhesive film. This arrangement produces homogeneously shaped holes 18.

In this case, the process for making a perforated adhesive film according to the invention consists of the following steps:

1. place the unperforated adhesive film on an appropriate support;
2. place the plate fitted with its punches on the adhesive film, such that the main plane of the plate is parallel to the surface of the adhesive film;
3. apply the plate on the adhesive film, according to the required punching direction, keeping the main plane of the plate parallel to the surface of the adhesive film until penetration of the punches corresponds to the required value for the dimensions of the holes 18;
4. remove the plate fitted with its punches;
5. recover the perforated adhesive film.

If the adhesive film to be perforated is long, it will be advantageous to use a plate fitted with punches with dimensions smaller than the dimensions of the adhesive film. The entire film is then perforated by making a relative displacement between the plate fitted with punches and the adhesive film.

In particular, this relative displacement may be obtained by displacing the support of the adhesive film with respect to the plate fitted with punches, each time after the plate is used. In this case, steps 1 to 4above are unchanged and the step 4 is followed by the following steps:

4a. move the mobile support forward by a length corresponding to the length of the adhesive film that is perforated by the plate fitted with the punches;
4b. repeat steps 2, 3, 4 and 4a as many times as necessary until the entire length of the adhesive film is perforated;
5. recover the perforated adhesive film.

In practice, a person skilled in the art will choose the length such that the holes 18 made at the back of a region corresponding to carrying out steps 2, 3 and 4 and the holes made at the front of a region corresponding to carrying out steps 2, 3 and 4 are arranged without any discontinuity, both concerning their spacings and their orientations. Thus, the perforated adhesive film appearance is as if it were made with a single large plate fitted with punches.

In another embodiment of the perforated adhesive film according to the invention, the plate fitted with punches moves so as to perforate the different regions of the adhesive film in sequence, and the adhesive film then remains fixed.

In another embodiment of the perforated adhesive film according to the invention, the plate fitted with punches is replaced by a roller fitted with punches. The punches on the roller are then oriented along directions normal to its outside cylindrical surface. The roller fitted with punches can then be entrained in rotation at a speed servocontrolled to the forward movement of a rolling belt supporting the adhesive film to be perforated. The centerline of the roller is then located in a plane parallel to the plane of the rolling belt and is oriented along a direction perpendicular to the direction of advance of this belt.

In this case, the distance between the roller fitted with punches and the traveling belt is adjusted such that rotation of the roller about its centerline combined with the forward movement of the rolling belt forces the punches to penetrate into the adhesive film. This embodiment enables continuous production of long perforated adhesive films.

The invention claimed is:

1. Process for producing a sandwich panel having a cellular structure having two faces, a plurality of adjacent cells opening up on at least a first face, at least one wall and an adhesive film inserted between said wall and said first face, the process comprising:
    punching an unperforated adhesive film in order to form at least one approximately circular hole having a diameter, wherein the punching the unperforated adhesive film is performed by at least one punch which comprises a conical end part with an angle β of between and including approximately 30° and 35°, and with an adjacent tapered part with an angle θ of between and including approximately 20° and 25°;
locating the adhesive film between the wall and the first face with one hole facing each of the cells of the cellular structure; and
gluing the wall to the first face,
wherein the adhesive film is perforated with at least one hole facing each of the cells of the cellular structure in which the holes are formed by punching an unperforated adhesive film, and wherein the at least one hole is approximately circular with a diameter that is not uniform over a thickness of the said film, and wherein the at least one hole is tapered.

2. Process according to claim 1, in which all the holes are made by punching the adhesive film in the same direction.

3. Process according to claim 1, wherein the punching the unperforated adhesive film is performed using a plate including a plurality of punches, wherein the plurality of punches form a plurality of holes in the adhesive film.

4. Process according to claim 3, wherein the punching of the unperforated adhesive film is perforated using a plate having dimensions smaller than the adhesive film, a relative displacement between the plate and the adhesive film being performed between two successive punching steps to perforate the entire film.

5. Process according to claim 1, wherein the punching the unperforated adhesive film is performed with a rotary roller having at least one punch.

6. Process for producing a sandwich panel having a cellular structure having two faces, a plurality of adjacent cells opening up on at least a first face, at least one wall and an adhesive film inserted between said wall and the first face, the process comprising:
punching an unperforated adhesive film to form at least one approximately circular hole therethrough by at least one punch which comprises a conical end part with an angle β of between and including approximately 30° and 35°, and with an adjacent tapered part with an angle θ of between and including approximately 20° and 25°, wherein the at least one circular hole is tapered and has a diameter that is not uniform over a thickness of the film;
preparing the adhesive film on the first face to provide an adhesive characteristic thereon; and
adhering the wall to the first face.

7. A sandwich panel, comprising:
a cellular structure having two faces;
a plurality of adjacent cells opening up on at least a first of the faces; and
at least one wall and an adhesive film inserted between the wall and the first face wherein the adhesive film glues the wall with the first face,
wherein the adhesive film is perforated with at least one hole facing each of the cells of the cellular structure, and wherein the at least one hole is tapered, approximately circular, and having a diameter that is not uniform over a thickness of the adhesive film, the hole being formed by at least one punch which comprises a conical end part with an angle β of between and including approximately 30° and 35°, and with an adjacent tapered part with an angle θ of between and including approximately 20° and 25°.

8. A sandwich panel, comprising:
a cellular structure having two faces; and
a plurality of adjacent cells opening up on at least a first of the faces; and
at least one wall and an adhesive film inserted between the wall and the first face wherein the adhesive film glues the wall with the first face,
wherein the adhesive film is perforated with at least one hole facing each of the cells of the cellular structure, the hole tapering from the first face;
wherein the holes are aligned with each other along two directions forming an angle of about 60° between them; and
wherein the holes are at a spacing Px equal to approximately 7×Po/9.5 along a first of the said directions and at a distance Py equal to approximately 4.5×Po/9.5 in a direction orthogonal to this first direction, where Po is the pitch separating the cells of the cellular structure.

9. A sandwich panel, comprising:
a cellular structure, having at least two faces;
a plurality of adjacent cells opening up on at least one of the faces; and
at least one wall and an adhesive film inserted between the wall and a first face wherein the adhesive film glues the wall with the first face,
wherein the adhesive film is perforated with a plurality of holes distributed according to a triangular network and being aligned with each other along two directions to form an angle of approximately 60° between them, the holes at a spacing Px equal to approximately 7×Po/9.5 along a first direction of the said directions and at a distance Py equal to approximately 4.5×Po/9.5 in a direction orthogonal to the first direction, where Po is the pitch separating the cells of the cellular structure,
the holes configured to face each of the cells of the cellular structure, at least one hole in the plurality being approximately circular with a diameter not uniform over a thickness of the said film, wherein the at least one hole is tapered to facilitate migration of the adhesive film toward ends of the walls of the cells located on the first face when the adhesive film is heated.

10. A sandwich panel according to claim 9, wherein the holes have an average diameter approximately equal to 1 mm.

* * * * *